(12) United States Patent
Steer et al.

(10) Patent No.: US 9,281,572 B2
(45) Date of Patent: Mar. 8, 2016

(54) APERTURE SYNTHESIS COMMUNICATIONS SYSTEM

(71) Applicant: RESEARCH IN MOTION LIMITED, Waterloo (CA)

(72) Inventors: David G. Steer, Nepean (CA); Robert Novak, Kanata (CA); Dongsheng Yu, Kanata (CA)

(73) Assignee: BlackBerry Limited, Waterloo (CA)

( * ) Notice: Subject to any disclaimer, the term of this patent is extended or adjusted under 35 U.S.C. 154(b) by 643 days.

(21) Appl. No.: 13/676,495

(22) Filed: Nov. 14, 2012

(65) Prior Publication Data

US 2014/0133322 A1 May 15, 2014

(51) Int. Cl.
*G01S 3/16* (2006.01)
*H01Q 21/20* (2006.01)
*H01Q 3/26* (2006.01)
*H04W 36/06* (2009.01)

(52) U.S. Cl.
CPC .............. *H01Q 21/20* (2013.01); *H01Q 3/26* (2013.01); *H04W 36/06* (2013.01)

(58) Field of Classification Search
CPC ................................ H01Q 21/20; H01Q 3/26
USPC ........................................................ 342/378
See application file for complete search history.

(56) References Cited

U.S. PATENT DOCUMENTS

| | | | |
|---|---|---|---|
| 4,633,257 A * | 12/1986 | Apostolos et al. | 342/445 |
| 4,978,962 A | 12/1990 | Hisada et al. | |
| 5,797,082 A | 8/1998 | Lusignan | |
| 5,913,151 A | 6/1999 | Lusignan | |
| 6,008,760 A | 12/1999 | Shattil | |
| 6,331,837 B1 | 12/2001 | Shattil | |
| 6,775,520 B2 | 8/2004 | Sabotic et al. | |
| 6,882,868 B1 | 4/2005 | Shattil | |
| 6,985,545 B2 | 1/2006 | Teo et al. | |

(Continued)

OTHER PUBLICATIONS

Cohanim, et al., "The Design of Radio Telescope Array Configurations Using Multiobjective Optimisation: Imaging Performance Versus Cable Length", The Astrophysical Journal Supplement Series, vol. 154, Oct. 2004, pp. 705-719.

(Continued)

*Primary Examiner* — Frank J McGue
(74) *Attorney, Agent, or Firm* — Todd A. Keeler; Borden Ladner Gervais LLP

(57) ABSTRACT

A method and apparatus are provided for improving capacity in wireless communications systems for use in areas having a high user traffic density. For reception, signals received from an antenna array are processed by performing a transformation comprising aperture synthesis to map signal content received from the antenna array to at least one element of a plurality of elements in an image plane storage to produce a time series of values for the at least one element, and then by assigning the at least one element to at least one radio access transceiver of a plurality of radio access transceivers for receiving the time series of values from the at least one element. For transmission, at least one radio access transceiver of a plurality of radio access transceivers is assigned to at least one element of a plurality of elements in an image plane storage, the assignment providing for the at least one element to receive a time series of values from the at least one radio access transceiver, and then a transformation is performed comprising antenna synthesis to map the time series of values from the at least one element to the signals for transmission by the antenna array.

25 Claims, 5 Drawing Sheets

(56) References Cited

U.S. PATENT DOCUMENTS

| | | |
|---|---|---|
| 2004/0004569 A1 | 1/2004 | Lam |
| 2005/0041752 A1 | 2/2005 | Rosen |
| 2005/0195103 A1 | 9/2005 | Davis et al. |
| 2007/0285315 A1 | 12/2007 | Davis et al. |
| 2011/0140954 A1 | 6/2011 | Fortuny-Guasch |

OTHER PUBLICATIONS

Cornwell et al., "A simple maximum entropy deconvolution algorithm", 1985, Astron. Astrophys., vol. 143, pp. 77-83.
Cornwell et al., "W Projection: A New Algorithm for Wide Field Imaging with Radio Synthesis Arrays", Astronomical Data Analysis Software and Systems XIV, ASP Conference Series, vol. 347, 2005.
Di Francesco, "A Crash Course in Radio Astronomy and Interferometry: 2. Aperture Synthesis", NAASC, available at https://science.nrao.edu/science/meetings/presentation/jdf.webinar.2.pdf, accessed Sep. 5, 2012.
Högbom, "Aperture Synthesis with a Non-Regular Distribution of Interferometer Baselines", Astron. Astrophys. Suppl., vol. 15, 1974, p. 417.
Greenhill, "Low-frequency Interferometry", Thirteenth Synthesis Imaging Workshop, May 29-Jun. 5, 2012, available at http://www.aoc.nrao.edu/9D2F8626-8D3F-4F4D-A66B-055762F8194C/FinalDownload/DownloadId-FC4D38D2CD004C785153F96DABF32908/9D2F8626-8D3F-4F4D-A66B-055762F8194C/events/synthesis/2012/lectures/greenhill.talk1.distrib.nrao.summer.school.2012.pdf.
Gull, et al., "The Maximum Entropy Method", IEE Proceedings, vol. 131, pt. F, No. 6, Oct. 1984.
Nityananda, "Deconvolution in sythesis imaging—an introduction", available at http://www.gmrt.ncra.tifr.res.in/gmrt_hpage/Users/doc/WEBLF/LFRA/pdf/ch12.pdf, accessed Sep. 5, 2012.
Pérez, "Calibration of Correlation Radiometers Using Pseudo-Random Noise Signals", Sensors, vol. 9, 2009 pp. 6131-6149.
Perley., "Fundamentals of Radio Interferometry", Thirteenth NRAO Synthesis Imaging summer school, May 29-Jun. 5, 2012, Socorro, NM, available at http://www.aoc.nrao.edu/events/synthesis/2012/lectures/SISS-13-Intro.pdf.
Perley., "Practicalities of Radio Interferometry", Thirteenth NRAO Synthesis Imaging summer school, May 29-Jun. 5, 2012, Socorro, NM, available at http://www.aoc.nrao.edu/events/synthesis/2012/lectures/SISS-13-Practical.pdf.
Reed, "Doctor of Philosophy Dissertation", Oct. 1999, University of South Australia.
Rohlfs et al., "Interferometers and Aperture Synthesis", Tools of Radio Astronomy, 3rd ed., New York: Springer 2000, pp. 162-185.
Steer, et al., "Enhancements to the deconvolution algorithm 'CLEAN'", Astron. Astrophys. vol. 137, 1984, pp. 159-165.
Treloar, "Investigation of Array Configurations for an Aperture-Synthesis Radio Telescope", Journal of the Royal Astronomical Society of Canada, vol. 83, No. 2, 1989, pp. 92-104.
Willis, "Introduction to Aperture Synthesis—Part I", available at https://www.astrosci.ca/users/drao/twillis/cambridge_one.pdf, accessed Sep. 5, 2012.
Willis, "Introduction to Aperture Synthesis—Part II", available at https://www.astrosci.ca/users/drao/twillis/cambridge_two.pdf, accessed Sep. 5, 2012.
Wilner, "Imaging and Deconvolution", 12th Synthesis Imaging Workshop, Harvard-Smithsonian CfA, Jun. 9, 2010, Socorro, http://www.aoc.nrao.edu/9D2F8626-8D3F-4F4D-A66B-055762F8194C/FinalDownload/DownloadId-8996A0550B00BA07B8F09D191626EB76/9D2F8626-8D3F-4F4D-A66B-055762F8194C/events/synthesis/2010/lectures/wilner_synthesis10.pdf.
"Aperture synthesis", wikipedia, available at http://en.wikipedia.org/wiki/Aperture_synthesis, accessed Jan. 28, 2013.
"How Radio Telescopes Work", National Radio Astronomy Observatory, available at http://www.nrao.edu/index.php/learn/radioastronomy/radiotelescopes, accessed Jan. 28, 2013.
"Introduction to aperture synthesis, Just the very basics . . . ", available at http://www2.astro.psu.edu/users/alex/astro513_9.pdf, accessed Sep. 5, 2012.
"Radio Telescope", wikipedia, available at http://en.wikipedia.org/wiki/Radio_telescope, accessed Jan. 28, 2013.
"Theory of Interferometry and Aperture Synthesis", available at http://www.astro.ugto.mx/cursos/RadioAstronomy/Radioastronomy-4.pdf, accessed Sep. 5, 2012.
European Search Report for corresponding European Patent Application No. 12192598.6, Apr. 19, 2013, 1 page.
Office Action dated May 27, 2015, issued from the corresponding European patent application No. 12192598.6.

* cited by examiner

APERTURE SYNTHESIS COMMUNICATIONS SYSTEM

FIELD

The present disclosure relates generally to improving capacity in wireless communications systems for use in areas having a high user traffic density.

BACKGROUND

In link-based wireless communications systems, radio transceivers communicate with each other via antennas after establishing inter-transceiver radio links. In the case of a mobile radio communications system, for example, one transceiver may belong to a user's mobile device, and another transceiver may be located at a network base station where connections are made to information resources or other network users.

For communication involving a large number of mobile devices, a separate radio link and a separate connection to a network may be provided for each mobile device. In some wireless communications systems, in order to provide enough separate links to accommodate as many mobile devices as wish to communicate, the radio links are separated by being made orthogonal to each other. Techniques for providing orthogonality may take several forms, including separation in frequency, sometimes referred to as Frequency Division Multiple Access (FDMA), or time, sometimes referred to as Time Division Multiple Access (TDMA), or spreading code, sometimes referred to as Code Division Multiple Access (CDMA), or steered beam selection, sometimes referred to as Spatial Division Multiple Access (SDMA), or some combination of these. However, the number of orthogonal channels available using these techniques may be limited and this may create a limit on the number of mobile devices that can be accommodated in an area using common radio frequency spectrum. Also, scheduling and managing multiple orthogonal channels and radio resources may have growing complexity and overhead as the number of mobile devices increases.

To improve capacity in some systems, spatial or geographic separation may be used to separate the communications links. This separation may take the form of a coverage area divided into cells, where different coverage cells are used for communicating with different groups of mobile devices. Cells may be separated by the directional properties or location of different antennas that establish the area of each cell. Different frequency assignments or time-slots may be used to separate cells which may be adjacent or overlapping. In some systems, spatial separation may be effected through the use of directional beams in which multiple antennas focus radio signals into a beam in the direction of a mobile device (or a group of mobile devices), such as in SDMA. In spatial separation systems using directional beams, the number of beams that can be formed may be proportional to the number of elements in the antenna array used to form the beam. For example, to provide 100 beams to accommodate 100 mobile devices (or groups of mobile devices) may require an antenna array having about 100 antennas. SDMA systems may also entail considerable complexity for tracking mobile devices as they move.

Scaling orthogonal link-based techniques to accommodate a very large number of mobile devices and their traffic for a major sports or entertainment arena, which may include 50,000 to 70,000 or more mobile devices in a concentrated area, may be impractical. For example, using FDMA, TDMA, or CDMA to accommodate 70,000 mobile devices may require on the order of 70,000 orthogonal channels or codes within a limited common spectrum assignment. Directional antenna beam configurations may also be impractical because they may require tens of thousands of cells or antennas to accommodate all of the potential peak traffic.

BRIEF DESCRIPTION OF THE DRAWINGS

Examples of embodiments will be described in greater detail with reference to the accompanying drawings, in which.

DETAILED DESCRIPTION

Figure 1:
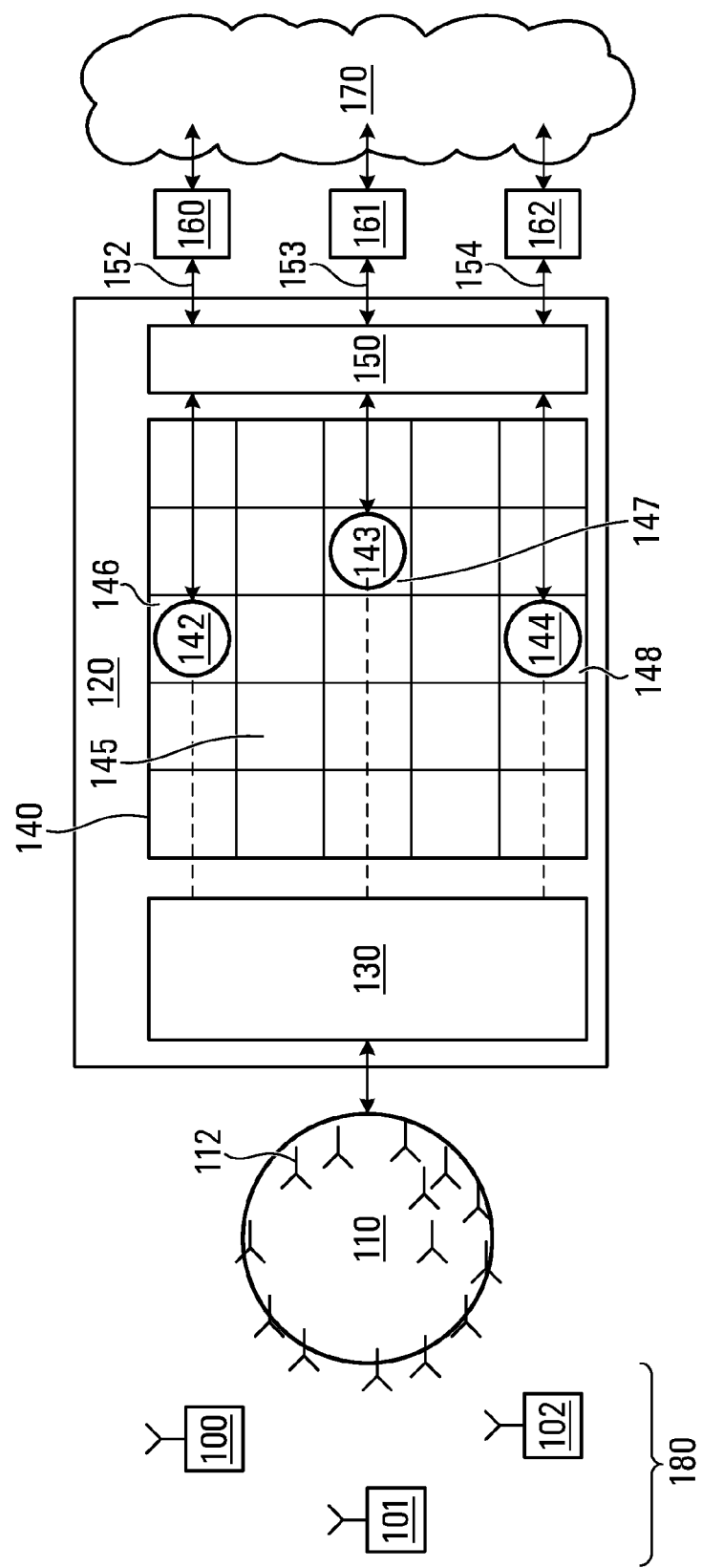
FIG. 1 is a block diagram of an example wireless communications system.

In one aspect, there is provided a method, in a synthesis apparatus, for processing signals received from an antenna array in a wireless communications system having a plurality of radio access transceivers and a plurality of mobile devices, the method comprising: performing a transformation comprising aperture synthesis to map signal content of the signals received from the antenna array to at least one element of a plurality of elements in an image plane storage to produce a time series of values for the at least one element; and assigning the at least one element to at least one radio access transceiver of the plurality of radio access transceivers for receiving the time series of values from the at least one element.

Optionally, performing a transformation comprising aperture synthesis comprises: measuring complex correlation of signals received from pairs of antennas of the antenna array to produce correlation samples; and using an inverse Fourier transform for mapping from the correlation samples to the time series of values for the at least one element.

Optionally, performing a transformation comprising aperture synthesis further comprises applying phase corrections determined based on signals from calibration sources.

Optionally, performing a transformation comprising aperture synthesis further comprises performing deconvolution.

Optionally, an algorithm for performing deconvolution is selected from one of CLEAN or the Maximum Entropy Method.

Optionally, the time series of values for the at least one element represents a signal for the at least one radio access transceiver to signal process according to a radio access technology used by at least one of the plurality of mobile devices.

Optionally, the radio access technology is one of GSM, CDMA, EDGE, UMTS, LTE, P25, TETRA, Wi-Fi, or evolved versions thereof.

Optionally, assigning comprises assigning an individual element to an individual radio access transceiver so as to permit the individual radio access transceiver to service at least one mobile device of the plurality of mobile devices having signal content mapped to the individual element by the transformation.

Optionally, assigning comprises assigning more than one element to an individual radio access transceiver so as to permit the individual radio access transceiver to service multiple coverage areas.

Optionally, a method as described above may further comprise dynamically adjusting the assignment based upon a traffic load.

Optionally, a method as described above may further comprise dynamically adjusting the assignment in response to mobility of a mobile device.

Optionally, a method as described above may further comprise responding to a change in the element to which signal content from a mobile device is mapped by the transformation, the change due to mobility of the mobile device from a coverage area mapped to an element assigned to a first radio access transceiver to a coverage area mapped to an element assigned to a second radio access transceiver, by allowing the mobile device to initiate handover from the first radio access transceiver to the second radio access transceiver.

Optionally, a method as described above may further comprise responding to mobility of a mobile device by adjusting weighting coefficients applied in a focusing operation to alter the transformation from signal content of the signals received from the antenna array to a time series of values for the at least one element.

In another aspect, there is provided a method, in a synthesis apparatus, for processing signals for transmission by an antenna array in a wireless communications system having a plurality of radio access transceivers and a plurality of mobile devices, the method comprising: assigning at least one radio access transceiver of the plurality of radio access transceivers to at least one element of a plurality of elements in an image plane storage, the assignment providing for the at least one element to receive a time series of values from the at least one radio access transceiver; and performing a transformation comprising antenna synthesis to map the time series of values from the at least one element to the signals for transmission by the antenna array.

Optionally, performing a transformation comprising antenna synthesis comprises: using a Fourier transform for mapping from the time series of values for the at least one element to a set of correlation samples; and deriving amplitude and phase of the signals for transmission based on the set of correlation samples.

Optionally, the time series of values from the at least one radio access transceiver represents a signal resulting from signal processing according to a radio access technology used by at least one of the plurality of mobile devices.

Optionally, the radio access technology is one of GSM, CDMA, EDGE, UMTS, LTE, P25, TETRA, Wi-Fi, or evolved versions thereof.

Optionally, assigning comprises assigning an individual radio access transceiver to an individual element so as to permit the individual radio access transceiver to service at least one mobile device of the plurality of mobile devices within a coverage area, the coverage area receiving, due to the transformation, signal content based on the time series of values from the individual element.

Optionally, assigning comprises assigning an individual radio access transceiver to more than one element so as to permit the individual radio access transceiver to service multiple coverage areas.

Optionally, a method as described above may further comprise dynamically adjusting the assignment based upon a traffic load.

Optionally, a method as described above may further comprise dynamically adjusting the assignment in response to mobility of a mobile device.

Optionally, a method as described above may further comprise responding to mobility of the mobile device from a coverage area receiving, due to the transformation, signal content based on a time series of values from a first element to a coverage area receiving, due to the transformation, signal content based on a time series of values from a second element by allowing the mobile device to initiate handover from a radio access transceiver assigned to the first element to a radio access transceiver assigned to the second element.

Optionally, a method as described above may further comprise responding to mobility of a mobile device by adjusting weighting coefficients applied in a focusing operation to alter how the time series of values for the at least one element is transformed to the signals for transmission.

In some aspects, there is provided a non-transitory processor readable medium having processor executable instructions stored thereon, that when executed cause one or more processors to implement one or more of the methods described herein.

In still another aspect, there is provided an apparatus for processing signals received from an antenna array in a wireless communications system having a plurality of radio access transceivers and a plurality of mobile devices, the apparatus comprising: a processor; an image plane storage having a plurality of elements; and an assignment device, wherein processing signals comprises: the processor performing a transformation comprising aperture synthesis to map signal content of the signals received from the antenna array to at least one element of the plurality of elements of the image plane storage to produce a time series of values for the at least one element; and the assignment device assigning the at least one element to at least one radio access transceiver of the plurality of radio access transceivers for receiving the time series of values from the at least one element.

Optionally, performing a transformation comprising aperture synthesis comprises the processor: measuring complex correlation of signals received from pairs of antennas of the antenna array to produce correlation samples; and using an inverse Fourier transform for mapping from the correlation samples to the time series of values for the at least one element.

Optionally, an apparatus as described above may further comprise the antenna array.

Optionally, a portion of the antenna array is arranged with a quasi-random spacing in at least one of a substantially circular or a substantially ovoid pattern having a view of an area for communications.

Optionally, another portion of the antenna array comprises a plurality of additional antennas for improving sampling of the area for communications, the plurality of additional antennas located in at least one of locations interior to and locations exterior to the substantially circular or substantially ovoid pattern.

Optionally, the antenna array comprises redundant antennas for providing coverage of occulted locations.

Optionally, an apparatus as described above may further comprise the plurality of radio access transceivers.

In a further aspect, there is provided an apparatus for processing signals for transmission by an antenna array in a wireless communications system having a plurality of radio access transceivers and a plurality of mobile devices, the apparatus comprising: a processor; an image plane storage having a plurality of elements; and an assignment device, wherein processing signals comprises: the assignment device assigning at least one radio access transceiver of the plurality of radio access transceivers to at least one element of the plurality of elements of the image plane storage, the assignment providing for the at least one element to receive a time series of values from the at least one radio access transceiver; and the processor performing a transformation comprising antenna synthesis to map the time series of values from the at least one element to the signals for transmission by the antenna array.

Optionally, performing a transformation comprising antenna synthesis comprises the processor: using a Fourier transform for mapping from the time series of values for the at least one element to a set of correlation samples; and deriving amplitude and phase of the signals for transmission based on the set of correlation samples.

Optionally, an apparatus as described above may further comprise the antenna array.

Optionally, a portion of the antenna array is arranged with a quasi-random spacing in at least one of a substantially circular or a substantially ovoid pattern having a view of an area for communications.

Optionally, another portion of the antenna array comprises a plurality of additional antennas for improving sampling of the area for communications, the plurality of additional antennas located in at least one of locations interior to and locations exterior to the substantially circular or substantially ovoid pattern.

Optionally, the antenna array comprises redundant antennas for providing coverage of occulted locations.

Optionally, an apparatus as described above may further comprise the plurality of radio access transceivers.

In another aspect, there is provided a system for receiving signals in a wireless communications system having a plurality of mobile devices, the system comprising: an antenna array; a processor; an image plane storage having a plurality of elements; an assignment device; and a plurality of radio access transceivers, wherein receiving signals comprises: the processor performing a transformation comprising aperture synthesis to map signal content of the signals received from the antenna array to at least one element of the plurality of elements of the image plane storage to produce a time series of values for the at least one element; and the assignment device assigning the at least one element to at least one radio access transceiver of the plurality of radio access transceivers for receiving the time series of values from the at least one element.

In a further aspect, there is provided a system for transmitting signals in a wireless communications system having a plurality of mobile devices, the system comprising: an antenna array; a processor; an image plane storage having a plurality of elements; an assignment device; and a plurality of radio access transceivers, wherein transmitting signals comprises: the assignment device assigning at least one radio access transceiver of the plurality of radio access transceivers to at least one element of the plurality of elements of the image plane storage, the assignment providing for the at least one element to receive a time series of values from the at least one radio access transceiver; and the processor performing a transformation comprising antenna synthesis to map the time series of values from the at least one element to the signals for transmission by the antenna array.

In some of the embodiments described below, methods and apparatus are described for accommodating radio communications in areas with very large user traffic density using common spectrum without requiring a separate orthogonal channel or antenna for each mobile device. Areas with very large user traffic density may include areas containing a large number of devices or high levels of traffic in a concentrated area. In such areas, a limited amount of radio spectrum may be available. Examples of areas with very large user traffic density may include sports or entertainment arenas where many tens of thousands of mobile devices, including mobile devices of event attendees and support staff, are concentrated. Other examples of areas in which very large user traffic density may occur include office floors, classrooms, or auditoriums.

In radio astronomy, techniques of aperture synthesis are used to synthesize the effect of a much larger antenna from an array of antennas, enabling high resolution imaging of the radio emissions of interstellar and galactic objects. Aperture synthesis may also be referred to as synthesis imaging. An outline of the principles of aperture synthesis is set out in K. Rohlfs and T. L. Wilson, *Tools of Radio Astronomy*, $3^{rd}$ ed. (New York: Springer, 2000), the contents of which are hereby incorporated by reference. Aperture synthesis techniques for radio astronomy may be used for one-way reception of emissions from celestial objects, with a desired result being an image of the radio brightness of a selected part of the sky.

When applied to wireless communications, techniques of aperture synthesis may allow the number of mobile devices that can be accommodated in an area to scale approximately as the square of the number of antennas in an antenna array.

In one example, a sports arena may have a seating capacity of about 50,000 concentrated into an area about 350 meters in diameter. With about 10,000 support staff for a large event, this may represent a device density of about 60,000 mobile devices in about 1 square kilometer (including some surrounding structure area). Peak traffic may require 100% device connectivity and 0% blocking, for example, at goal times, intermissions, the end of a game, or the end of a concert. To handle the peak traffic in such a venue, some link-based radio systems using antenna beams may require on the order of 60,000 antennas. Using aperture synthesis techniques of some embodiments disclosed herein, only about 400 antennas in an antenna array may be needed to support the peak traffic in such a venue.

FIG. 1 is a block diagram of an example wireless communications system. In the example illustrated, mobile devices 100, 101, 102 are located within an area that may be referred to as the object plane 180. Antenna array 110 containing a plurality of antennas 112 is coupled to synthesis apparatus 120. The synthesis apparatus 120 comprises a processor 130 and assignment device 150, each having access to an image plane storage 140. Image plane storage 140 comprises a plurality of elements 145. Assignment device 150 is coupled either directly or indirectly to a plurality of radio access transceivers 160, 161, 162 through a plurality of cell channels 152, 153, 154. The plurality of radio access transceivers 160, 161, 162 are coupled to a communications network 170 via either wireless or wired connections. Although a particular number and configuration of mobile devices, antennas, cell channels, radio access transceivers, and networks are depicted, more generally, there may be any number and configuration of any of these, or of other items depicted in FIG. 1. In particular, in some embodiments, synthesis apparatus 120 may incorporate one image plane storage 140 for use in receiving communications and another distinct image plane storage 140 for use in transmitting communications.

In some embodiments described below, the mobile devices 100, 101, 102 are in communication with endpoints in communications network 170. Mobile devices 100, 101, 102 may be any type of device such as phones, handsets, smart-phones, tablets, that are used in wireless communications. More generally, mobile devices 100, 101, 102 may also include fixed or desktop devices capable of wireless communications. Mobile devices 100, 101, 102 may be distributed in high density in an area such as a sports or entertainment arena. Although the area where the mobile devices 100, 101, 102 are located is referred to herein as the object plane, it need not be a planar surface.

Wireless communications protocols and radio access technologies (RATs) used by mobile devices 100, 101, 102 may include Global System for Mobile (GSM), Code Division Multiple Access (CDMA), Enhanced Data rates for GSM Evolution (EDGE), Universal Mobile Telecommunications System (UMTS), Long Term Evolution (LTE), Project 25 (P25), Terrestrial Trunked Radio (TETRA), Wi-Fi, evolved versions of the foregoing, or other protocols or radio access technologies. Radio access transceivers 160, 161, 162 perform signal processing and protocols associated with radio access technologies being used by the mobile devices 100, 101, 102. For example, radio access transceivers 160, 161, 162 may make use of different protocols and radio access technologies such as, for example, GSM, CDMA, EDGE, UMTS, LTE, P25, TETRA, Wi-Fi, or evolved versions of the foregoing. Aperture synthesis techniques in some embodiments disclosed herein may be independent of particular radio access technologies being used for communications. Radio access transceivers 160, 161, 162 may be communicatively coupled, either directly or indirectly, to multiple networks (including, but not limited to, the Internet) with multiple interface formats that accommodate multiple types of communications to other users and services. In an example system where radio access transceivers 160, 161, 162 communicate via UMTS, an interface between at least one radio access transceiver and network 170 may be an "Iub" reference point, which may connect the at least one radio access transceiver to at least one Node B.

In some embodiments, synthesis apparatus 120 performs processing of signals received from mobile devices via antenna array 110. In some embodiments, synthesis apparatus 120 performs processing for signals to be transmitted to mobile devices via antenna array 110. In still further embodiments, synthesis apparatus 120 performs processing both of signals received from mobile devices, and for signals to be transmitted to mobile devices.

When processing for receiving, the antenna array 110 provides radio signals received from the mobile devices 100, 101, 102 as input to processor 130. Processor 130 synthesizes an image plane from signals received from the antenna array 110, the image plane being a representation of the object plane 180 where the mobile devices 100, 101, 102 are located, and stores this in image plane storage 140. To synthesize the image plane, processor 130 performs a transformation comprising aperture synthesis.

The image plane comprises a plurality of elements. Each element corresponds with an area of the object plane 180. Each element is a value which is a numerical representation of signal content generated in the corresponding area of the object plane; these elements are stored in the image plane storage 140. In FIG. 1, the image plane is depicted as a two-dimensional array of elements 145 stored in image plane storage 140. In the example depicted in FIG. 1, three elements 146, 147, 148 containing values 142, 143, 144 are depicted, these elements containing values corresponding to parts of the object plane 180 where mobile devices 100, 101, 102 are located. Due to mathematical properties of the processing performed by processor 130, the three elements 146, 147, 148 in the image plane storage 140 containing values 142, 143, 144 are depicted as a mirror image of mobile devices 100, 101, 102 within the image plane 180. It should be understood that the depicted configuration of image plane storage 140 is for illustrative purposes only, and that the contents of elements 145 in image plane storage 140 will vary over time. Also, for simplicity, fewer elements 145 in image plane storage 140 are depicted than may be possible to synthesize given the number of antennas 112 depicted in antenna array 110.

Contents of image plane storage 140 are updated by the processor 130 with values, the updated values over time forming a time series of values, at a sampling rate sufficient to represent signals received from mobile devices 100, 101, 102. Assignment device 150 assigns individual radio access transceivers 160, 161, 162 to one or more individual elements 145 in the image plane storage 140.

In the illustrated example, at the instant depicted, the assignment device 150 has assigned element 146 to transceiver 160. At the instant depicted, element 146 corresponds to the location of mobile device 100; as such, assigning element 146 to transceiver 160 amounts to assigning transceiver 160 to handle signal content generated by mobile device 100. Similarly, transceiver 161 is assigned to handle signal content generated by mobile device 101, and transceiver 162 is assigned to handle signal content generated by mobile device 102.

The assignment of a given element to a given transceiver means that a time series of values of the given element will be processed by the given transceiver. There are various mechanisms for communicating the values from the elements in the image plane storage 140 to the transceivers. In some embodiments, assignment device 150 conveys a time series of values from an element in image plane storage 140 to one or more radio access transceivers assigned to that element. In other embodiments, a radio access transceiver may read one or more time series of values from one or more elements in image plane storage 140 assigned to that radio access transceiver.

In some embodiments, assignment device 150 comprises a switching matrix that reads values from elements in image plane storage 140 and, via switched connections that correspond to assignments between elements and radio access transceivers, communicates these values to outputs of the switching matrix that are connected to the radio access transceivers 160, 161, 162. In some embodiments, assignment device 150 comprises a microprocessor executing software instructions to assign individual elements 146, 147, 148 in the image plane storage to particular radio access transceivers 160, 161, 162. In some embodiments, such software instructions could be executed by radio access transceivers 360. In other embodiments, image plane storage 140 may passively perform the functions of assignment device 150, for example when there is a fixed assignment between image plane storage elements 146, 147, 148 and radio access transceivers 160, 161, 162.

When processing for transmitting, the image plane stored in image plane storage 140 is a representation of the object plane 180 where the mobile devices 100, 101, 102 are located. The image plane comprises a plurality of elements. Each element corresponds with an area of the object plane 180. An assignment device 150 enables individual radio access transceivers 160, 161, 162 to be assigned to individual elements 146, 147, 148 in the image plane storage 140. The assignments enable radio access transceivers 160, 161, 162 to provide their assigned elements 146, 147, 148 each with time series of values for transmission. Contents of image plane storage 140 are updated with values from radio access transceivers 160, 161, 162 according to the assignments at a sampling rate sufficient to represent signals for transmission to mobile devices 100, 101, 102.

There are various mechanisms for communicating the values from radio access transceivers 160, 161, 162 to their assigned elements 146, 147, 148 in the image plane storage 140. In some embodiments, assignment device 150 conveys one or more time series of values for transmission from a radio access transceiver to one or more elements in image plane storage 140 assigned to that radio access transceiver. In other embodiments, a radio access transceiver may write one or more time series of values for transmission into elements in image plane storage 140 assigned to that radio access transceiver.

Each value provided to individual elements 145 in the image plane storage 140 is a value which is a numerical representation of signal content for transmission at a given moment in time to the corresponding area of the object plane 180. Processor 130 synthesizes signals for transmission by the antennas 112 of antenna array 110 based on the contents of image plane storage 140. To synthesize the signals for transmission, processor 130 performs a transformation comprising antenna synthesis. The synthesized signals are provided as output to the antennas 112 of antenna array 110 for transmission to mobile devices 100, 101, 102.

When processing for receiving and when processing for transmitting, in embodiments where radio access technologies used by the mobile devices 100, 101, 102 permit communication with multiple mobile devices within a coverage region, an element 145 in image plane storage 140 may correspond to parts of the object plane 180 containing multiple mobile devices. In some embodiments, multiple radio access transceivers, for example using radio access transceivers 100, 101, 102 using different radio access technologies or frequency bands, may be assigned to the same element in the image plane storage 140, for example to provide services for different types of mobile devices 100, 101, 102. In some embodiments, multiple elements in the image plane storage 140 may be assigned to a single radio access transceiver. The maximum number of mobile devices 100, 101, 102 the synthesis apparatus 120 can service in the object plane 180 may be denoted by N. The maximum number of radio access transceivers 160, 161, 162 assigned to elements in the image plane storage 140 may be denoted by M. In some embodiments, M will be less than N. The difference between M and N may vary depending on the expected traffic per mobile device and the number of mobile devices that may be accommodated within an element 145 by the radio access technologies in use.

In some embodiments, synthesis apparatus 120 may be agnostic to the radio access technologies used by the mobile devices 100, 101, 102 and may be used without modification to mobile devices that may also be used with conventional orthogonal link-based communications systems. Synthesis apparatus 120 may also be agnostic to the radio access technologies used by radio access transceivers 160, 161, 162 and may be used without modification to radio access transceivers that may also be used with conventional orthogonal link-based communications systems.

Embodiments of synthesis apparatus 120 may be implemented in hardware or a combination of hardware and software. As some examples, embodiments of synthesis apparatus 120 making use of custom hardware, application-specific integrated circuits (ASICs), field programmable gate arrays (FPGAs), microprocessors, parallel processors, stream processors, vector processors, digital signal processors (DSPs), graphics processing units (GPUs), or a combination thereof, are contemplated.

Figure 2:
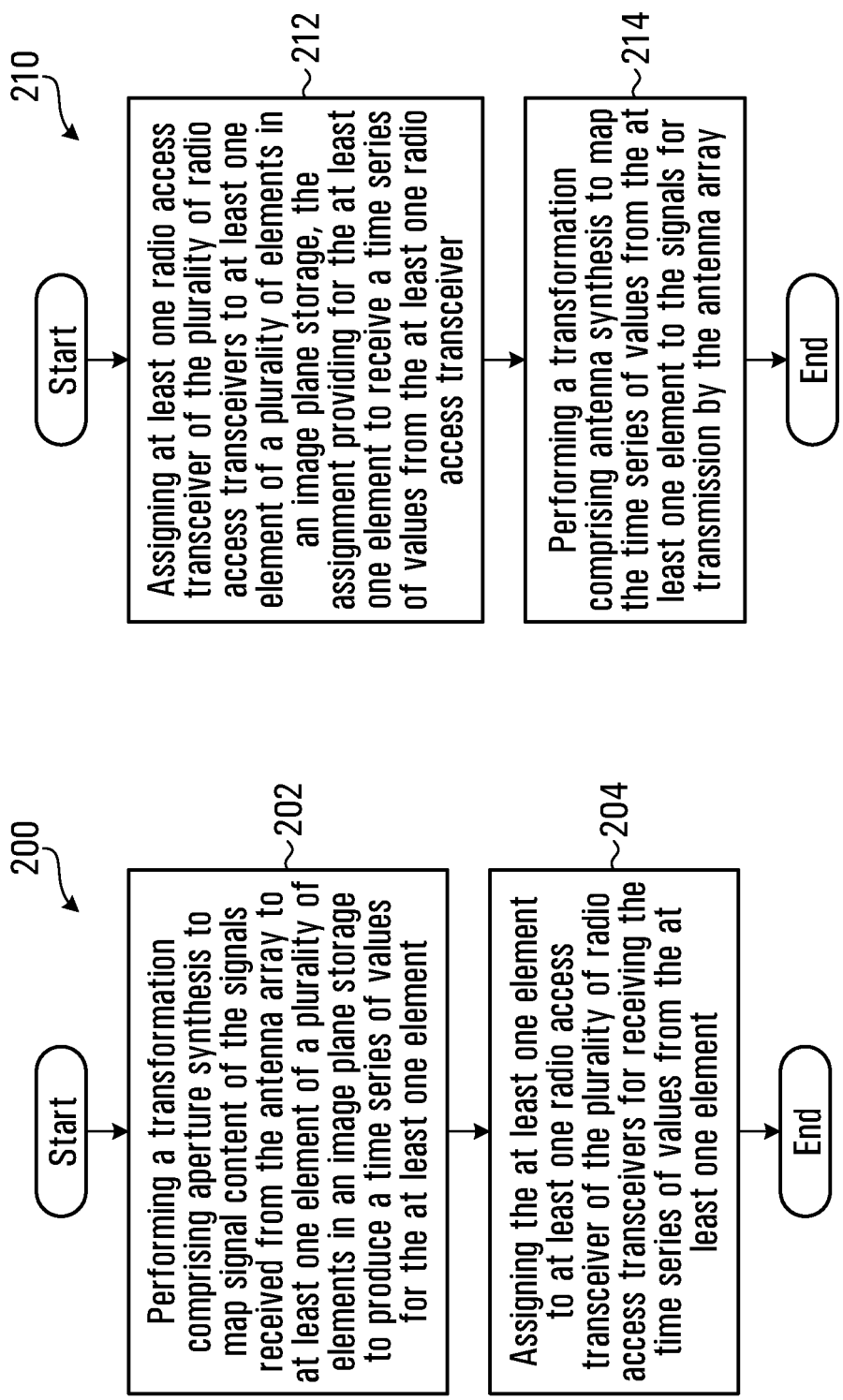
FIG. 2A is a flowchart of a method of processing signals received in a wireless communications system.
FIG. 2B is a flowchart of a method of processing signals for transmission in a wireless communications system.

FIG. 2A is a flowchart of a method 200 for processing signals received from an antenna array in a wireless communications system having a plurality of radio access transceivers and a plurality of mobile devices.

At block 202, a transformation comprising aperture synthesis is performed to map signal content of the signals received from the antenna array to at least one element of a plurality of elements in an image plane storage to produce a time series of values for the at least one element. Then, at block 204, the at least one element is assigned to at least one radio access transceiver of the plurality of radio access transceivers for receiving the time series of values from the at least one element.

FIG. 2B is a flowchart of a method 210 for processing for transmission by an antenna array in a wireless communications system having a plurality of radio access transceivers and a plurality of mobile devices.

At block 212, at least one radio access transceiver of the plurality of radio access transceivers is assigned to at least one element of a plurality of elements in an image plane storage, the assignment providing for the at least one element to receive a time series of values from the at least one radio access transceiver. Then, at block 214, a transformation comprising antenna synthesis is performed to map the time series of values from the at least one element to the signals for transmission by the antenna array.

While FIGS. 2A and 2B are described and depicted as flowcharts, it should be understood that the functionality described does not need to take place in the specific order described, and some of the elements may overlap in time.

In some embodiments, only the method of FIG. 2A is implemented. In some embodiments, only the method of FIG. 2B is implemented. In some embodiments, both the method of FIG. 2A, and the method of FIG. 2B are implemented. In some embodiments, the execution of the method of FIG. 2A and the method of FIG. 2B may overlap with the execution of the method of FIG. 2B some of the time.

A wireless communications system such as depicted in FIG. 1 may be used to execute the method of FIG. 2A or the method of FIG. 2B, but that is only one specific example.

The Antenna Array

Each antenna 112 in antenna array 110 may be composed of several antenna elements that improve the gain of the antenna or focus the direction of reception/transmission towards a coverage area of interest. For example, the antennas 112 of the antenna array 110 may include shields on their backsides to screen them from signals from areas outside a coverage zone.

Many configurations of antennas 112 within antenna array 110 are suitable for use with a synthesis apparatus 120 according to the principles described herein. In some particularly advantageous embodiments, the antennas 112 within the antenna array 110 may generally have a quasi-random spacing in an approximately circular (or elliptical or ovoid) pattern surrounding, or having a view of, a coverage zone with some additional antennas 112 placed on an arm or in a pattern in the interior of the circular (or elliptical or ovoid) pattern. Such an arrangement of antennas 112 has been shown to provide relatively uniform coverage for the purposes of aperture synthesis. See, for example, Babak E. Cohanim et al., "The Design of Radio Telescope Array Configurations Using Multiobjective Optimisation: Imaging Performance Versus Cable Length", *The Astrophysical Journal Supplement Series*, vol. 154 (October 2004), pp. 705-719, or Norman C. Treloar, "Investigation of Array Configurations for an Aperture-Synthesis Radio Telescope", *Journal of the Royal Astronomical Society of Canada*, vol. 83, no. 2 (1989), pp. 92-104, the contents of which are hereby incorporated by reference. In some embodiments, additional antennas 112 may be placed on an arm or in a pattern exterior to the circular (or elliptical or ovoid) pattern. Such additional antennas 112 exterior to the general pattern of antennas 112 within the antenna array 110 may be advantageous when the pattern is an ovoid pattern or when the pattern contains corners.

In some embodiments, a circular (or elliptical or ovoid) arrangement of antennas 112 may be placed near the top of the outside periphery of an arena so as to provide a view from each antenna 112 into the arena's seating space. In some embodiments, improved performance may be obtained by screening or shielding antennas 112 on sides not facing into the arena's seating space to suppress extraneous signals from outside the desired arena coverage area.

In some embodiments, redundant antennas 112, for example extra antennas 112 with duplicate pairing, may be provided on opposite sides of the antenna array 110. Extra pairs of antennas 112 may permit recovering signals from some mobile devices 100, 101, 102 that may be occulted by obstructions in radio paths between these mobile devices and some of the antennas 112. Sampling information produced from extra pairs of antennas 112 may be used as alternate samples for processing involving corresponding image plane elements 145 that may be occulted by objects in radio paths between mobile devices 100, 101, 102 and some of the antennas 112.

In some embodiments, for a large stadium or concert arena, the number of elements in image plane storage 140 is desired to be roughly proportional to the number of seats or the total number of mobile devices. For example, in the case of a 60,000 seat arena which might be expected to contain 60,000 mobile devices at full capacity, an example embodiment may use about 400 antennas situated around the periphery of the arena. With this number of antennas, there are 400×(400−1)/2=79,800 pairs of antennas, which, in some embodiments, may accommodate approximately the same number of synthesized elements in the image plane, for reasons addressed below. Although the elements in the image plane may not be always aligned to correspond directly with the locations of the mobile devices, in some embodiments this number of image plane elements may be sufficient, in combination with the multiple access and mobility capabilities of the radio access technologies used by the mobile devices 100, 101, 102 and the radio access transceivers 160, 161, 162, to deliver service to the 60,000 possible mobile devices in the arena.

While the aperture synthesis techniques described herein may be suited for use in scenarios with very large mobile device populations such as arenas, these techniques may also be applicable to smaller venues such as meeting rooms, office floors, or classrooms. In these scenarios, there may be a very high level of traffic to be accommodated for each mobile device within a limited amount of spectrum. The use of aperture synthesis may enable high frequency reuse and the provision of an independent channel for each mobile device without the difficulties of alternate approaches, such as approaches which may require providing a dynamic multiple-device beamforming and tracking mechanism. In some applications, the antenna array 110 may be incorporated into the ceiling of a room, the floor of a room, a wall of a room, a wall of a building, or the roof of a building.

In some embodiments, the antenna array 110 may be located in an area some distance from the mobile devices 100, 101, 102 being serviced, for example in a field or on a hill overlooking an arena, town, or city. Alternatively, the antenna array 110 may be distributed on the surface of one or more airborne platforms (for example, on a dirigible) above or near an arena, town, or city.

The imaging resolution of an aperture for a given wavelength is approximately 1.22 f×λ/D, where f is the focal length, D is the diameter of the aperture, and λ is the wavelength. For an example operating frequency of 1 GHz (λ of 0.3 m), and a maximum antenna separation (D) of about 350 meters across an arena, and a notional focal length of 350 meters (f), this may enable an imaging resolution of about 0.36 meters. Such an imaging resolution may be sufficient, for example, to provide an element in the image plane corresponding to each seat in the arena. Other embodiments of the invention are also suited to operation at other focal lengths, aperture diameters, and wavelengths, for example millimeter-wave radio wavelengths for high capacity indoor theatre or classroom applications.

In some embodiments, in order to allow for a better planar approximation, the antenna array 110 may be subdivided into several sub-arrays located throughout an area focused on sub-sections of that area. For example, four arrays may be used in an arena such that an array located on the south end of the arena is directed toward spectators on the north side of the arena, a north end array can serve south side spectators, a west end array can serve east side spectators, and an east side array can serve west side spectators. The areas covered by sub-arrays may have some overlap, and, in some embodiments, sub-arrays may share antennas. Sub-arrays may be processed separately and then combined into a single image plane representing the full view of the area. Antennas of the sub-arrays may have differing time (phase) delays incorporated in their correlations to match the differing distances and angles to their associated sub-sections of the object plane 180, which may be curved, for example to match the sloped seating plan of an arena. Such phase compensations may be similar to compensations applied to optical lenses to compensate for curved object planes or to create wide field-of-view "fish-eye" lenses.

In some embodiments, some antennas 112 of the antenna array 110 may also be arranged to receive the total of the signals from the object plane 180 and thereby provide the total power component needed for DC restoration in processing to calculate contents of the image plane, for example for restoration of a constant component or DC component in a Fourier transform or inverse Fourier transform process.

In some embodiments, antennas 112 of the antenna array 110 may also be connected in multiple configurations to enable synthesis of multiple image plane views of the object plane 180 at various resolutions. Combinations of antennas 112 may be provided, for example, to image a wide area of the object plane 180 that may be used for processing paging or control signaling such as the Random Access Channel (RACH) in a wireless network.

Uplink Processing

Figure 3:
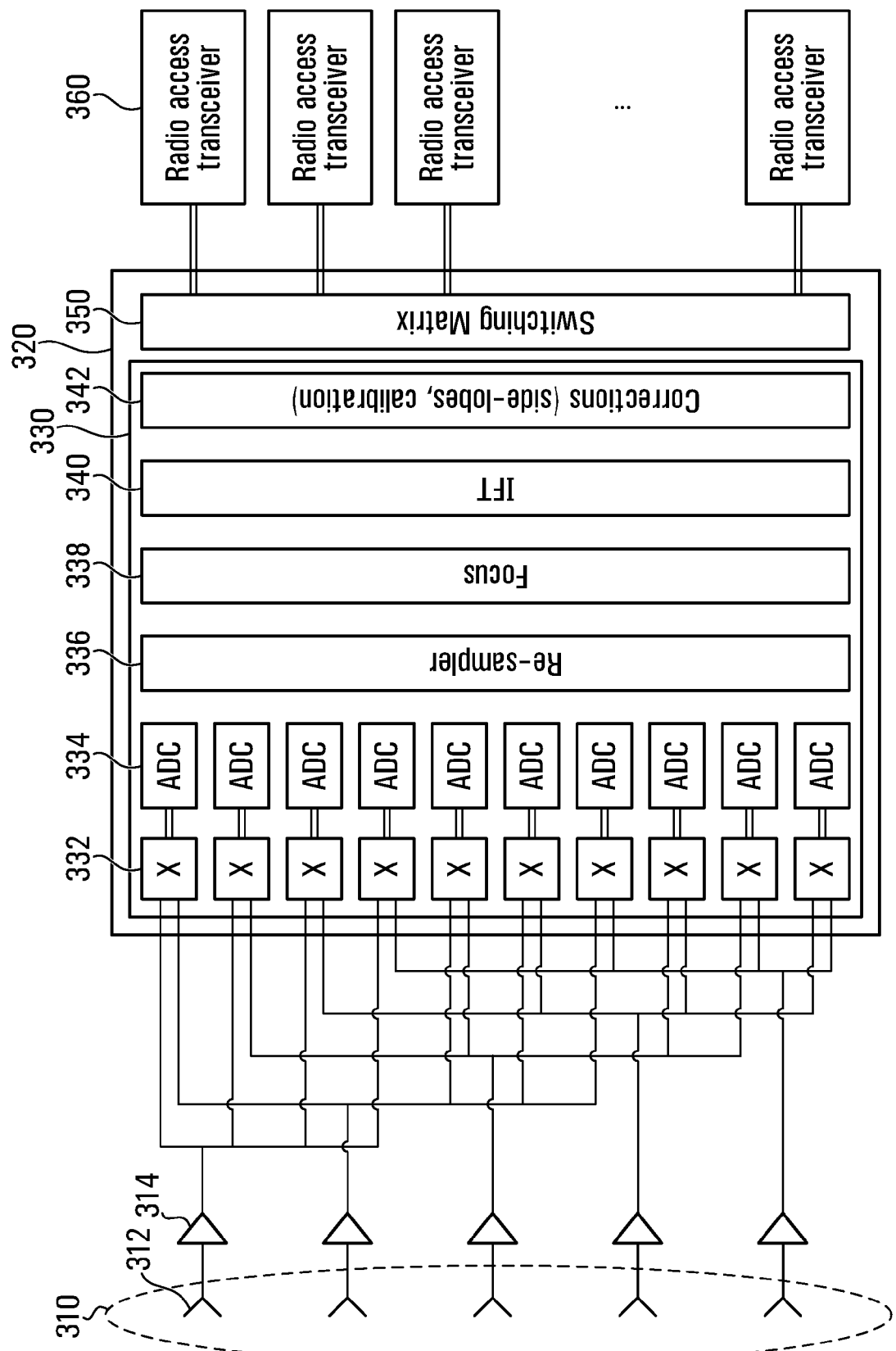
FIG. 3 is a schematic block diagram illustrating uplink processing in an example configuration of a wireless communications system.

FIG. 3 is a schematic block diagram illustrating uplink processing in an example configuration of a wireless communications system using aperture synthesis. In the example configuration shown, antenna array 310 contains five antennas 312. Antennas 312 are coupled to low noise amplifiers (LNAs) 214. The outputs of LNAs 214 are coupled to complex correlators 332 of processor 330 of synthesis apparatus 320. The outputs of LNAs 214 are coupled to complex correlators 332 in such a manner that each correlator receives input from a unique pair of antennas 312. (With respect to the connections between LNAs 214 and complex correlators 332, FIG. 3 is drawn according to the convention that lines that cross are not connected, whereas lines that end at another line are connected.) Because five antennas 312 are depicted in the example configuration, there are ten unique pairs of antennas, and therefore ten complex correlators 332 are illustrated.

Output from each complex correlator 332 is coupled to a corresponding analog-to-digital converter (ADC) 334 of processor 330. Processor 330 further comprises a resampler 336, focusing unit 338, inverse Fourier transform unit 340, and corrections unit 342. Synthesis apparatus 320 further comprises switching matrix 350, which is coupled to a plurality of radio access transceivers 360, which may be further coupled either directly or indirectly to a communications network (not shown).

While the example configuration of a wireless communications system shown in FIG. 3 is intended to be illustrative, other configurations containing fewer or more components are possible. For example, it should be understood that an application of the uplink processing techniques disclosed herein to a large venue would utilize more antennas 312 and consequently larger numbers of complex correlators 332 and other illustrated blocks. Also, for simplicity, not shown in FIG. 3 are units, typically known as "duplexers", that may be connected to each of the antennas 312. Duplexers may separate the uplink (received) signals, destined for the complex correlators 332, from downlink (transmitted) signals. Also not shown in FIG. 3 for simplicity are downconverter mixers and local oscillator distribution connections.

Uplink processing refers to receiving signals sent by mobile devices. For uplink processing, signals from individual antennas 312 may first be amplified by the LNAs 314. Optionally, uplink processing may be performed at "baseband" by down-converting to a convenient intermediate frequency (IF) with adjustment of phase compensation for path lengths at the lower frequency. An apparatus for down conversion is not illustrated in FIG. 3, but it may be of any type commonly used in radio communication systems that maintains common phase for all of the down conversion mixers. Down-conversion of the signals may take place before or after the LNAs 314.

Processor 330 then measures the complex cross correlation of the signals from all possible pairs of antennas 312 in the antenna array 310 using complex correlators 332. If there are X antennas 312 in the antenna array 310, then processor 330 measures $X(X-1)/2$ complex correlations, one for each of the possible pairs of antennas 312, to produce correlation samples. The correlation samples may be a complex number representing radio frequency and phase. The coordinate system in which the correlation samples are represented is referred to as the aperture plane, or alternatively as the sampling plane or u-v plane. After correlation, the correlation samples output from complex correlators may be converted from analog to digital format using ADCs 334.

It may be important that the phase of the signals be accurately preserved among all the antennas 312, complex correlators 332, and ADCs 334. Fibre optical communications links may be a practical means to couple the antennas 312, complex correlators 332, ADCs 334, and other blocks, and to preserve phase alignment accurately. It may be practical to co-locate each LNA 214 and downconverter mixer at an antenna 312 with a common local oscillator signal being distributed through phase compensated links to all antennas 312. Alternate arrangements, for example with analog-to-digital conversion before performing correlation, and correlation performed in the digital domain, may also be used with suitable arrangements to maintain phase of the signals at the correlators. The components illustrated in FIG. 3 may also equivalently be located in a notional concentration or "cloud" processor.

The outputs of ADCs 334 may optionally be further processed, such as by resampler 336 and/or focusing unit 338, each of which is discussed in greater detail below, before being transferred to inverse Fourier transform unit 340. Inverse Fourier transform unit 340 performs a two-dimensional complex inverse Fourier transform of the measured correlation samples in order to synthesize elements of an image plane; these elements are stored in an image plane storage. Because of the "conservation of data" principle inherent in Fourier and inverse Fourier transform processing, there may be about the same number of elements in the image plane resulting from the output of inverse Fourier transform unit 340 as there are correlation samples. Each element stored in the image plane storage may contain a complex valued sample of the radio signal in a corresponding area of the object plane.

Optionally, image plane elements resulting from the output of inverse Fourier transform unit 340 may be further processed by corrections unit 342, for example for compensating for imaging artifacts or performing phase calibration.

The rate at which correlation samples are produced and subsequently processed is selected so as to supply image plane elements to the image plane storage at a rate suitable for the radio access transceivers 360 to communicate using a particular radio access technology. Switching matrix 350 may deliver the contents of elements in the image plane storage to assigned radio access transceivers 360. Thus, over time, switching matrix 350 may deliver a time series of complex values to assigned radio access transceivers 360. As a consequence, each radio access transceiver 360 assigned to an image plane element may receive the same radio signal content as it would have if the radio access transceiver 360 had a dedicated antenna for a small coverage area in the object plane, for example about the size of a seat or a few seats in an arena. In this way, a set of radio access transceivers 360 may work in parallel using common spectrum to serve the aggregate number of mobile devices in the arena.

In some embodiments, processor 330 may produce complex correlation samples from signals received by pairs of antennas 312 in the antenna array 310 at different sampling rates to enable multiple different radio access technologies to be handled. To sample signals from the antenna array 310 at different rates, processor 330 may contain multiple sets of processing hardware or software, for example multiple inverse Fourier transform units 340. Alternatively, sampling of the signals from the antenna array 310 may be performed at a suitable rate to support multiple technologies as discussed in U.S. Pat. No. 6,985,545, the contents of which are hereby incorporate by reference. In some embodiments, the signals from the antenna array 310 may also be sampled at different rates to facilitate creating image planes for different frequency bands and/or to support carrier aggregation among bands.

In some embodiments, processing performed by processor 330 may also include adjustments to compensate for atmospheric propagation, phase calibrations, sampling, occultation, antenna gain patterns, focus, and/or correction for beam sidelobes.

Because of practical effects of the processing performed by processor 330, there may be some blurring between adjacent image plane elements. To address this blurring, in some embodiments, the radio access transceivers 360 may operate with a reuse pattern, for example a frequency reuse of 7, across the image plane elements.

As indicated above, output from the inverse Fourier transform unit 340 is a synthesized image plane containing a plurality of elements that are stored in an image plane storage. Each element of the image plane may represent a sample of the radio signals (amplitude and phase) transmitted by mobile devices in an object plane area corresponding to that element.

The image plane synthesis process may thus create a notional "radio image" of the area covered by the antenna array 310 including radio signals from mobile devices in that area. In effect, the correlation and inverse Fourier transform processes may create a large number of mini-cells across the object plane area.

As mobile devices may not be evenly distributed throughout the object plane and not all mobile devices may be active simultaneously, some image plane elements may be "dark" (i.e. without any received signal) and some may be "bright" with a received signal, perhaps from multiple mobile devices. If mobile traffic is sparse, many image plane elements may be dark, and in some embodiments some of the computations of the inverse Fourier transform may be simplified or omitted in order to synthesize only the elements in the image plane that have active mobile devices. In some embodiments, the inverse Fourier transform may be calculated by inverse Fourier transform unit 340 using an inverse fast Fourier transform (IFFT) algorithm.

The inverse Fourier Transform performed by inverse Fourier transform unit 340 may preserve the information content of the correlation samples and so the number of elements in the synthesized image plane may be about the same as the number of correlation samples from complex correlators 332. The process of synthesizing the image plane elements may be analogized to, for example, a television camera focused on the interior of a stadium arena producing a digital image plane of pixels representing the color and brightness of each of the seats in the stadium. Thus, elements of the image plane produced by processor 330 and stored in the image plane storage may represent values of the amplitude and phase of the radio signals from each corresponding object plane area, for example corresponding seats of the stadium. The radio access transceivers 360 assigned to particular image plane elements may process the values for their assigned image plane elements from the image plane storage, which over time form a time series of values, according to a radio access technology format. By processing according to a radio access technology format, the radio access transceivers 360 receive communications sent from a mobile device, and the radio access transceivers 360 then forward the received communications to destination network connections. If, for example, there are multiple mobile devices in the object plane area corresponding to an image plane element, then a radio access transceiver 360 may process multiple signals from these mobile devices in a manner equivalent to the radio access transceiver being assigned a traditional single cell containing multiple mobile devices. For example, common techniques such as spatial multiplexing, code division multiplexing, and time division multiplexing may be implemented by radio access transceivers 360 such that several mobile devices' signals can be efficiently multiplexed via one image plane element.

Because radio access technologies may include the capability to serve multiple mobile devices within a channel, one radio access transceiver 360 may service multiple image plane elements. Similarly, if a radio access technology in use includes techniques for radio access transceivers 360 to work together to receive signals from multiple cells, the same techniques may be applied to multiple image plane elements.

Processor 330 may provide operations for focusing, grid re-sampling, and corrections including compensation for imaging artifacts and phase calibration.

Focusing may be applied to the correlation samples by focusing unit 338 to correct for practical arrangements in which the object plane may not be planar and the antennas 312 may be at different elevations. The seating in a venue arena, for example, is often bowl-shaped. Focus correction may compensate for this geometry by adding a time delay (or phase correction) to the correlation samples. The necessary delays may be determined, for example, through the use of calibration radio sources placed in the object plane and determining the delays necessary to concentrate the antenna signals into the correct image plane elements. One reference describing the use of such calibration radio sources is T. J. Cornwell et al., "W projection: A New Algorithm for Wide Field Imaging with Radio Synthesis Arrays", *Astronomical Data Analysis Software and Systems XIV*, ASP Conference Series, vol. 347 (2005) [hereinafter Cornwell], the contents of which are hereby incorporated by reference.

In some embodiments, focus correction may involve application of time delays (or phase correction) and/or weights via complex weighting coefficients applied at focusing unit 338. In some embodiments, the time delays and/or weights may be applied within the processing of the inverse Fourier transform unit 340. The weights may be applied with variability in multiple dimensions. For example, different weights may be applied to different correlation samples, and in addition, the weights applied to correlation samples may vary in other dimensions, such as with time. In some cases, the application of these weights may provide for a more complex transformation of the signal. Further, the application of these weights (either alone or in combination with further corrections and/or modifications) may result in the concatenation of the applied weights and the transform not corresponding to the conventional formal definition of an inverse Fourier transform. Therefore, in some embodiments, the operations performed by focusing unit 338 and inverse Fourier transform unit 340 together with corrections unit 342 may constitute a more generalized transformation according to a set of complex weighting coefficients.

Correlation samples may also be re-sampled to a rectangular grid by resampler 336. The positioning of the correlation samples in the aperture plane may depend on the separation and relative angle of the baseline between each pair of antennas 312. The correlation samples may thus be distributed over the aperture plane but may not be distributed at convenient regular grid points. However, the correlation samples may be interpolated or resampled to provide correlation samples at rectangular grid points for convenient further processing by inverse Fourier transform unit 340. When resampling, it may be advantageous to ensure that as few grid points as possible, and particularly all those grid points between actual points sampled by the correlation samples, are estimated and not left as zeros. This may improve the clutter or beam-spreading in the image plane calculated from the correlation samples. One advantage of resampling the correlation samples to a rectangular grid format may be that efficient inverse Fast Fourier transform (IFFT) algorithms may be used by inverse Fourier Transform unit 340 if the number of grid points is approximately a power of 2. Another advantage may be that the image plane elements in the image plane synthesized by inverse Fourier Transform unit 340 may be of uniform size and orientation. However, resampling requires an extra step that can involve many calculations. Also, in some cases resampling may degrade the quality of the data represented by the correlation samples. Further, in some cases resampling may cause calculations to be performed that may not be necessary; for example, IFFT calculations may sometimes be streamlined if only a few of the correlation samples are nonzero. Therefore, in some embodiments, it may be appropriate to perform an inverse Fourier Transform on the focused correlation samples directly, without resampling to a grid, and then make use of the resulting non-uniform or non-rectangular arrangement of image plane elements in subsequent operations of synthesis apparatus 320. When resampling is performed, resampler 336 may also apply corrections to the correlation samples to correct for aberrations.

The inverse Fourier transform performed by inverse Fourier transform unit 340 is a two-dimensional inverse Fourier Transform. As indicated previously, each of the image plane elements synthesized by inverse Fourier transform unit 340 may be a complex valued number representing the amplitude and phase of the radio signal of a corresponding area of the object plane. In applications of aperture synthesis for radio astronomy, a two-dimensional inverse Fourier Transform may be a good approximation for the imaging process for geometries in which there is a relatively small angle between the axis of the antenna array 310 and the sources to be imaged. In contrast, in some radio communications applications of aperture synthesis according to techniques described herein, such as applications directed to communications within the interior of an arena, the angles between the sources (in the form of the mobile devices) and the axis of antenna array 310 may be quite large. In such a configuration, further processing may be employed to correct for angular distortion. This may be accomplished, for example, through projection of the correlation samples on to a curved surface as discussed in Cornwell as well as in R. Perley, "Practicalities of Radio Interferometry", *Thirteenth NRAO Synthesis Imaging summer school* (2012), the contents of which are hereby incorporated by reference. However, as synthesis apparatus 320 for radio communications applications may be operating continuously and in real-time, corrections needed in radio astronomy applications to compensate for motion of the Earth may not be required. In some cases, corrections to account for a curved object plane may be computed by analogy to the corrections used in the design of "fish-eye" or "wide-angle" lenses for optical imaging systems such as TV cameras.

Some further corrections may be performed on the synthesized image plane elements. For example, the synthesized image plane elements may be contaminated by the "synthetic beam pattern" of the antenna array 310. The magnitude of this effect may depend on the number of antennas 312 in the antenna array 310, and the details of their spacing and orientations. If the configuration of antennas 312 results in relatively uniform sampling of the aperture plane, the suppression of sidelobes of the synthetic beam pattern may scale roughly with the square of the number of antennas 312, and so with an antenna array 310 including a hundred or more antennas 312, the sidelobe artifacts may be of the order of 40 dB down. A number of techniques may be used for further reduction of such artifacts to achieve improved resolution. Some of the most practical may include the iterative "CLEAN" algorithm and its variants. Alternatively, the Maximum Entropy Method ("MEM") algorithm may be used to compensate for image plane artifacts. Some of these algorithms are described in Cornwell as well as the following references, the contents of which are hereby incorporated by reference:

"Aperture Synthesis with a Non-Regular Distribution of Interferometer Baselines", Högbom, J. A., *Astron. Astrophys. Suppl.*, vol. 15, p. 417 (1974);

"Enhancements to the deconvolution algorithm 'CLEAN'", Steer, D. G., Dewdney, P. E. & Ito, M. R., *Astron. Astrophys.*, vol. 137, p. 159 (1984); and "The Maximum Entropy Method", Steve Gull and John Skilling, *Indirect Imaging*, ed. J. A. Roberts (1984).

Such techniques may be particularly effective if there are known calibration sources in the object plane. For wireless communication applications, the availability of calibration sources, such as transmitters at fixed known locations in the object plane, may be used to calibrate the aperture synthesis process performed by synthesis apparatus 320 to improve signal quality in each synthesized image plane element. Such calibration transmitters may be placed at known locations through the object plane area, for example at known locations in an arena, and then used to calibrate the process of synthesizing the image plane.

The image plane storage may represent the image plane elements as complex values stored in memory elements, for example in a random access memory (RAM). Embodiments using other forms of memory are also contemplated, such as the use of content-addressable memories or solid state disks (SSD). The radio access transceivers 360 may receive values from image plane elements stored in the image plane storage by reading particular memory locations of the image plane storage. In some embodiments, the memory used to store the image plane elements may thus act as a passive switching matrix enabling any radio access transceiver 360 to access the value of any image plane element to which the radio access transceiver 360 has been assigned. Alternatively, a separate switching matrix 350 may be provided to mediate between image plane storage and radio access transceivers 360.

Some radio access transceivers 360 may be assigned to multiple image plane storage elements to extend the coverage area of such radio access transceivers 360. While for maximum capacity one radio access transceiver 360 may be provided for each element in the image plane storage, for most traffic conditions a smaller number of transceivers may be provided that are each assigned to multiple elements in the image plane storage. Each radio access transceiver 360 may be capable of handling traffic from multiple mobile devices. In some areas of the image plane, where there is very high traffic, a single radio access transceiver 360 may be assigned per element in image plane storage, whereas in lower traffic areas, a radio access transceiver 360 may be assigned to multiple elements in image plane storage. Such assignments of transceivers 360 to elements in image plane storage may also be dynamic. For example, the links between transceivers and elements in image plane storage may change as mobile devices move about an arena coverage area.

Radio access transceivers 360, after receiving time series of values from elements in the image plane storage, the time series of values representing communications received from mobile devices in corresponding areas of the object plane, transmit those communications to intended destinations via network connections. This may be achieved in the same manner as is used in wide area cellular systems in which traffic from mobile devices is sent by the serving-cell radio access transceiver (or base station) via network connections to a destination. In the context, for example, of a UMTS mobile wireless network, an interface between a radio access transceiver 360 and another network could be the "Iub" network reference point. Radio access transceivers 360 may have connections to multiple networks, such as other mobile communications networks or the Internet, and be compatible with various protocols and interface formats in order to facilitate communications to other users and services.

Downlink Processing

Figure 4:
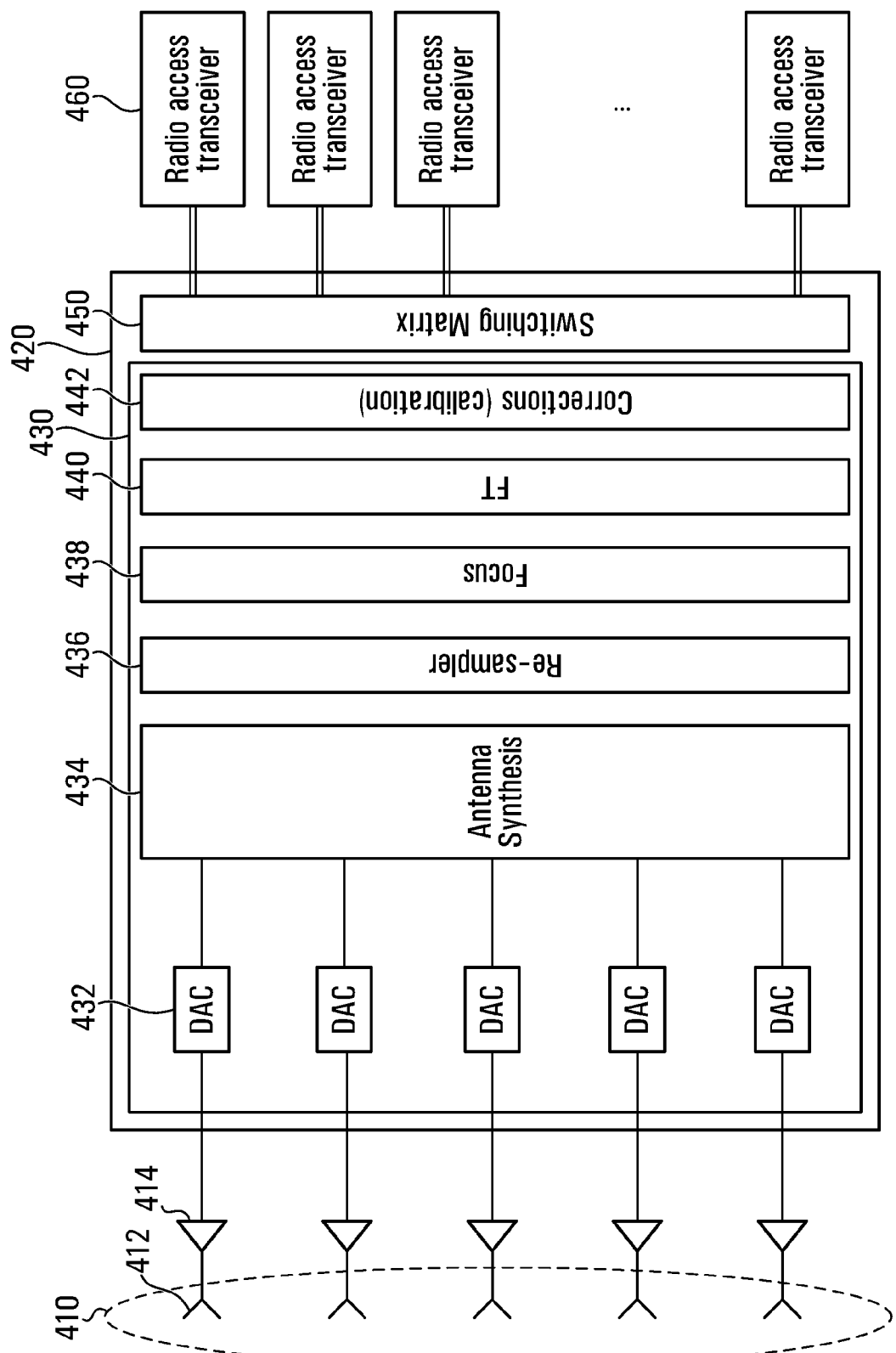
FIG. 4 is a schematic block diagram illustrating downlink processing in an example configuration of a wireless communications system.

FIG. 4 is a schematic block diagram illustrating downlink processing in an example configuration of a wireless communications system. In the example configuration shown, antenna array 410 contains five antennas 412. Antennas 412 are coupled to the outputs of power amplifiers (PAs) 414. The inputs of each PA 414 are coupled to digital-to-analog converters (DAC) 432 of processor 430 of synthesis apparatus 420. Each DAC 432 is coupled to antenna synthesis unit 434 of processor 430. Processor 430 further comprises a resampler 436, focusing unit 438, Fourier transform unit 440, and corrections unit 442. Synthesis apparatus 420 further comprises switching matrix 450, which is coupled to a plurality of radio access transceivers 460, which may be further coupled either directly or indirectly to a communications network (not shown).

While the example configuration of a wireless communications system shown in FIG. 4 is intended to be illustrative, other configurations containing fewer or more components are possible. For example, it should be understood that an application of the downlink processing techniques disclosed herein to a large venue would utilize more antennas 412 and consequently larger numbers of other illustrated blocks. Also, for simplicity, not shown in FIG. 4 are duplexers that may be connected to each of the antennas 412 to separate downlink (transmitted) signals generated by the antenna synthesis processor 434 from uplink (received) signals. Also not shown in FIG. 4 for simplicity are upconverter mixers and local oscillator distribution connections.

Downlink processing refers to transmitting signals to mobile devices. For downlink processing, radio access transceivers 460 may receive communications information via network connections. This may be achieved in the same manner as is used in wide area cellular systems in which traffic intended for mobile devices is directed from a global network via network connections to a cell-transceiver (or base station). In the context, for example, of a UMTS mobile wireless network, an interface between a radio access transceiver 460 and another network could be the "Iub" network reference point.

Signals received by radio access transceivers 460 for transmission to particular mobile devices may be conveyed by switching matrix 450, as a time series of values, to an element in an image plane storage that corresponds to a coverage area in the object plane where the particular mobile device is situated. At a particular instance in time, those elements in image storage for which there are no signals to transmit to corresponding mobile devices may contain a value of zero, and those elements in image plane storage for which there is a signal to transmit to corresponding mobile devices may contain a non-zero value. The contents of non-zero elements in image plane storage may be complex values representing the amplitude and phase of radio signals for transmission.

The operation of processor 430 for downlink processing may generally be the inverse to the processing used for the uplink direction described previously. Values of elements in image plane storage are transformed by Fourier transform unit 440 using a two-dimensional Fourier transform to create complex correlations of the signals for transmission for the pairs of antennas 412 in the antenna array 410.

Prior to the operation of Fourier transform unit 440, the values of elements in image plane storage may be subject to corrections by corrections unit 442 based on calibrations previously derived from calibration sources in the object plane. In some embodiments, focusing in the form of application of time delays (or phase correction) and/or weights via complex weighting coefficients may also be applied by focusing unit 438 to sharpen the area definition in the object plane. More generally, complex weighting coefficients (i.e., involving amplitude and phase) can be applied by focusing unit 438 to achieve a variety of focusing operations, including for example, tracking, depth correction, focus, and calibration. Specific weighting coefficients for the operation of focusing unit 438 may be dynamically adjusted by the processor 430 based on information derived from calibration receivers set in the object plane and fed back to processor 430. In some embodiments, the time delays and/or weights may be applied within the processing of the Fourier transform unit 440. The weights may be applied with variability in multiple dimensions. For example different weights may be applied to different complex correlations from Fourier transform unit 440, and in addition, the weights applied to complex correlations may vary in other dimensions, such as with time. In some cases, the application of these weights may provide for a more complex transformation of the signal. Further, the application of these weights (either alone or in combination with further corrections and/or modifications) may result in the concatenation of the applied weights and the transform not corresponding to the conventional formal definition of a Fourier transform. Therefore, in some embodiments, the operations performed by focusing unit 438 and Fourier transform unit 440 together with corrections unit 442 may constitute a more generalized transformation according to a set of complex weighting coefficients.

In some embodiments, output from Fourier transform unit 440 (optionally after having been focused by focusing unit 438) may be resampled by resampler 436. The set of complex correlations from Fourier transform unit 440 or from resampler 436 are then transformed by the antenna synthesis unit 434 into the appropriate amplitude and phase for each radio frequency (RF) signal to be radiated by each antenna 412 in the antenna array 410. The RF signals for each antenna 412 may be derived by solving a set of linear equations relating the antennas 412 in the antenna array 410 and the set of complex correlations, subject to constraints of individual transmitter power and total power.

Once computed by antenna synthesis unit 434, the signal for each antenna may be converted from digital to analog format by DACs 432 and then amplified to the necessary RF power by PAs 414 feeding the antennas 412 in the antenna array 410.

As with the uplink processing, it may be important that the phase of the signals for transmission be accurately preserved in the transmission chain through to the antennas 412. Fibre optic communications links may be one practical way to distribute the signals accurately to the individual PAs 414, local oscillators, and their associated antennas 410.

As a result of the downlink processing steps set out above, the synthesis apparatus 420 including antenna synthesis unit 434 may generate the composite radio signals to be radiated by the antennas 412 in the antenna array 410 for reception by mobile devices in each area of the object plane. If, for example, there are multiple mobile devices within an object plane area corresponding to a particular element in the image plane storage, a radio access transceiver 460 assigned to that particular element may generate a composite signal for that particular image plane element according to the designated radio access technology or technologies used to communicate with the multiple mobile devices in the same manner as the radio access transceiver 460 would if it was communicating with a large area mobile cell with the multiple mobile devices in coverage. Similarly, if there is signaling channel information associated with a radio access technology in use, the signaling channel information may be added by a radio access transceiver 460 to the value of an element in image plane storage assigned to that radio access transceiver, thus producing a composite element value which will be transmitted to the corresponding object plane area as a composite radio signal.

Radio Access Transceiver Assignments

Radio access transceivers may be assigned to each synthesized image plane element in image plane storage much like in a multi-cellular system in which each base-station is assigned a cell for its coverage. There may be one radio access transceiver assigned for each of the synthesized image plane elements in image plane storage, but in some embodiments where the traffic is expected to be lower than one mobile device set for each possible image plane element in image plane storage, there may be a smaller number of radio access transceivers than image plane elements. In this case, a radio access transceiver may be dynamically assigned to an element in image plane storage when there is mobile traffic to be served in the element. In one embodiment, the assignment of radio access transceivers may be relatively static and mobility of mobile devices as they move about the object plane may be handled by mobile network handover procedures, such as procedures used to hand-off between base stations. As mobile devices move, they may appear as signals in neighboring elements in image plane storage and may be detected by the radio access transceivers assigned to those neighboring elements, and the responsibility for communication services may be redirected to new radio access transceivers when necessary.

In some alternate embodiments, the functionality of the radio access transceivers may be divided into several separate processes. For example, channel access control and paging signaling that may involve communications to multiple devices in multiple areas may be separated from traffic functions, such as speech and data traffic channels and their associated signaling, that may be dedicated to single mobile devices. In such an embodiment, a radio access transceiver may be assigned to multiple elements in image plane storage to process incoming channel requests (for example, requests transmitted in a random access channel or "RACH") which may be processed and then assigned to appropriate transceivers to handle traffic. Paging messages to initiate calls to previously idle mobile devices may also be processed by a specialized radio access transceiver assigned to multiple elements in the image plane storage. Similarly, traffic channel radio access transceivers may specialize in packet or switched circuit (speech) services and may thereby optimize the radio interface activities and the network interfaces to switched or packet networks. By accessing multiple elements in image plane storage, some radio access transceivers may contact multiple mobile devices in parallel and conserve both processing resources as well as radio access resources. In the context of the UMTS radio access technology, a wireless communications system using aperture synthesis may assume the role of the RNC ("Radio Network Controller") and multiple Node-B ("base stations") and may interface with a core communications network at the "Iu-CS" and "Iu-PS" reference points.

Mobile activity in an area of the object plane may be detected with a scanning radio access transceiver that may be assigned to any un-serviced elements in image plane storage. Also, initial mobile signals may be detected using a refocusing of the aperture synthesis process, such as the application of an inverse Fourier transform with different weights, to enable a detection radio access transceiver to more efficiently detect energy from multiple object plane areas and, for example, to identify a newly active mobile call request. The synthesis process may also be refocused for downlink processing by applying a Fourier transform with different weights, for example to page a mobile device at an uncertain location for an incoming call or an incoming data packet.

Mobile Device Mobility

In some portions of the discussion above, the aperture synthesis process has been described as a synthesis of image plane elements where, for example, each image plane element represents a small group of seats in a stadium and a radio access transceiver is assigned to the corresponding element in image plane storage for a group of seats to handle the traffic from the occupants. In the event that individual occupants from the seat grouping represented by an element in image plane storage move about the stadium (e.g., to obtain refreshment), their traffic may be handed over to the radio access transceivers assigned to nearby elements in image plane storage as they move. Such a technique for handling mobility may have the advantage that if there are multiple mobile devices within an area of the object plane corresponding to an element of the image plane, the orthogonality of their signals may be maintained by the radio access technology protocols in use. This is because radio access technology protocols include signaling protocols for mobility handovers among base stations or radio access transceivers. As such, an aperture synthesis communications system may be incorporated incrementally into an existing network, reusing existing network equipment and mobile devices.

In some embodiments, synthesized image plane elements in image plane storage may be assigned to individual mobile devices, and these elements may be adjusted to follow mobile devices as they move about the object plane. The aperture synthesis communications system may thus become a tracking system. Such tracking may be achieved by performing a Fourier transform or inverse Fourier transform tailored to each mobile device's location. Such a transform, for example, may be achieved by selecting weights associated with focusing or associated with the transform to select the particular area of the arena occupied by the mobile device and tracking the mobile device while moving by adjusting the weights in a manner that may be analogous to tracking systems used, for example, in planar array radar systems. Such embodiments may permit each individual radio access transceiver to only handle the communications for a single mobile device, and thus the design of each radio access transceiver may be simplified compared to a complete base station capable of handling multiple mobile devices. Such embodiments may also have the advantage that no handover may be necessary as mobile devices move about the object plane, which may ensure continuity of services and may save network signaling resources. A radio access transceiver for communicating with a single mobile device may, for example, be constructed from a chipset designed for handsets in order to reduce the transceiver's cost and power consumption. However, such single mobile device configurations may also include signaling to accommodate conditions where multiple mobile devices are concentrated in one area, for example at exits or concession-stand line-ups. In those cases, some mobile device tracking transceivers may hand over traffic to static transceivers dedicated to handling traffic from areas with a high concentration of traffic.

Mobile Devices

Figure 5:
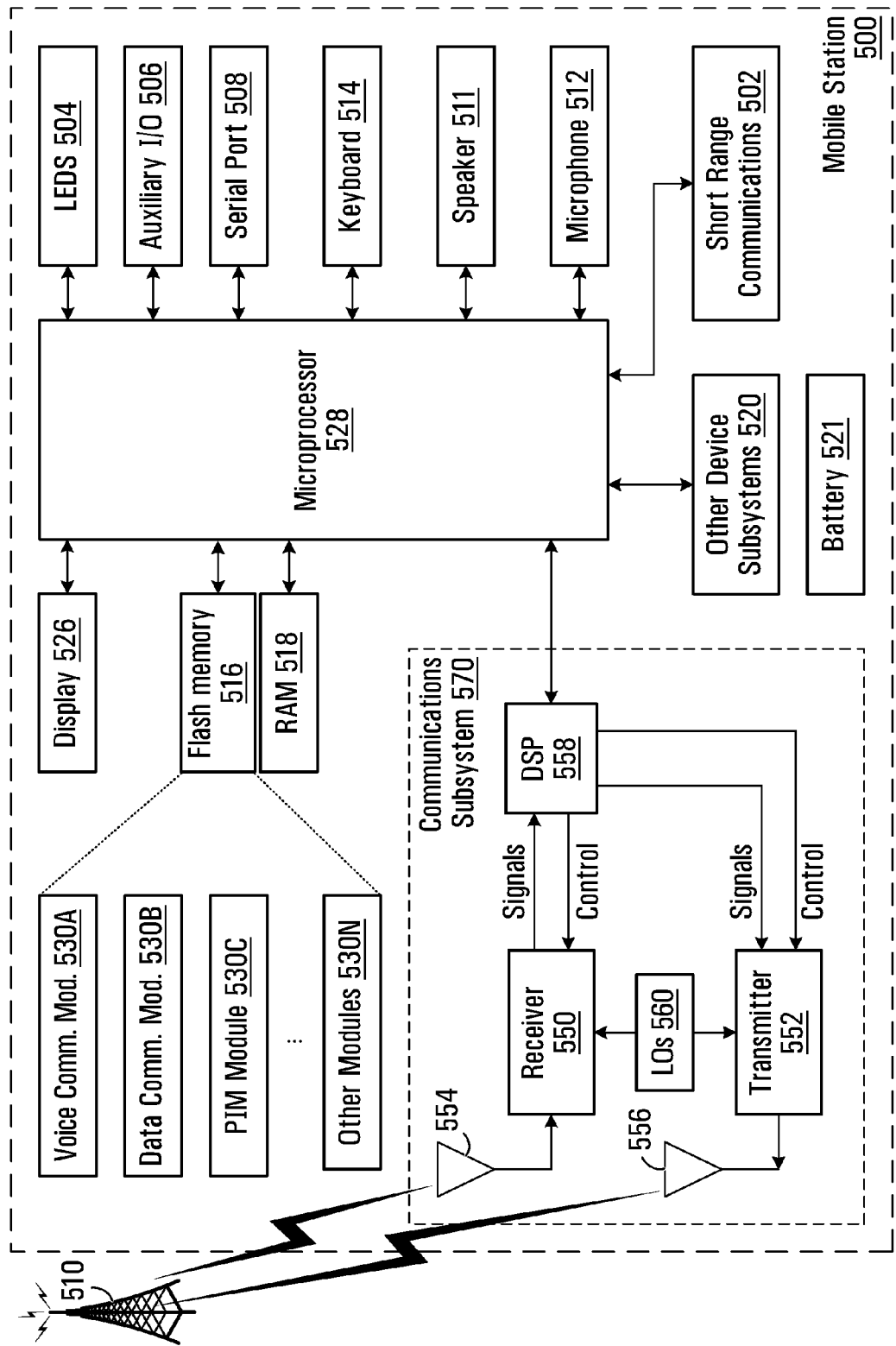
FIG. 5 is a schematic block diagram of an example mobile device.

Referring now to FIG. 5, shown is a schematic block diagram of an example mobile device 500 that may participate in the methods described in this disclosure and communicate with the apparatuses described in this disclosure. It is to be understood that mobile device 500 is shown with very specific details for example purposes only.

A processing device (a microprocessor 528) is shown schematically as coupled between a keyboard 514 and a display 526. The microprocessor 528 controls operation of the display 526, as well as overall operation of the mobile device 500, in response to actuation of keys on the keyboard 514 by a user.

The mobile device 500 has a housing that may be elongated vertically, or may take on other sizes and shapes (including clamshell housing structures). The keyboard 514 may include a mode selection key, or other hardware or software for switching between text entry and telephony entry.

In addition to the microprocessor 528, other parts of the mobile device 500 are shown schematically. These include: a communications subsystem 570; a short-range communications subsystem 502; the keyboard 514 and the display 526, along with other input/output devices including a set of LEDs 504, a set of auxiliary I/O devices 506, a serial port 508, a speaker 511 and a microphone 512; as well as memory devices including a flash memory 516 and a Random Access Memory (RAM) 518; and various other device subsystems 520. The mobile device 500 may have a battery 521 to power the active elements of the mobile device 500. The mobile device 500 is in some embodiments a two-way radio frequency (RF) communication device having voice and data communication capabilities. In addition, the mobile device 500 in some embodiments has the capability to communicate with other computer systems via the Internet.

Operating system software executed by the microprocessor 528 is in some embodiments stored in a persistent store, such as the flash memory 516, but may be stored in other types of memory devices, such as a read only memory (ROM) or similar storage element. In addition, system software, specific device applications, or parts thereof, may be temporarily loaded into a volatile store, such as the RAM 518. Communication signals received by the mobile device 500 may also be stored to the RAM 518.

The microprocessor 528, in addition to its operating system functions, enables execution of software applications on the mobile device 500. A predetermined set of software applications that control basic device operations, such as a voice communications module 530A and a data communications module 530B, may be installed on the mobile device 500 during manufacture. In addition, a personal information manager (PIM) application module 530C may also be installed on the mobile device 500 during manufacture. The PIM application is in some embodiments capable of organizing and managing data items, such as e-mail, calendar events, voice mails, appointments, and task items. The PIM application is also in some embodiments capable of sending and receiving data items via a wireless network 510. In some embodiments, the data items managed by the PIM application are seamlessly integrated, synchronized and updated via the wireless network 510 with the device user's corresponding data items stored or associated with a host computer system. As well, additional software modules, illustrated as another software module 530N, may be installed during manufacture.

Communication functions, including data and voice communications, are performed through the communication subsystem 570, and possibly through the short-range communications subsystem 502. The communication subsystem 570 includes a receiver 550, a transmitter 552 and one or more antennas, illustrated as a receive antenna 554 and a transmit antenna 556. In addition, the communication subsystem 570 also includes a processing module, such as a digital signal processor (DSP) 558, and local oscillators (LOs) 560. The specific design and implementation of the communication subsystem 570 is dependent upon the communication network in which the mobile device 500 is intended to operate. For example, the communication subsystem 570 of the mobile device 500 may be designed to operate with the Mobitex™, DataTAC™, General Packet Radio Service (GPRS), Enhanced Data Rates for GSM Evolution (EDGE), Evolution Data Optimized (EVDO), or Long Term Evolution (LTE) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 570 may also be designed to operate with an 802.11 Wi-Fi network, and/or an 802.16 WiMAX network. Other types of data and voice networks, both separate and integrated, may also be utilized with the mobile device 100, 101, 102.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 500 may send and receive communication signals over the communication network 510. Signals received from the communication network 510 by the receive antenna 554 are routed to the receiver 550, which provides for signal amplification, frequency down conversion, filtering, channel selection, etc., and may also provide analog to digital conversion. Analog-to-digital conversion of the received signal allows the DSP 558 to perform more complex communication functions, such as demodulation and decoding. In a similar manner, signals to be transmitted to the network 510 are processed (e.g., modulated and encoded) by the DSP 558 and are then provided to the transmitter 552 for digital to analog conversion, frequency up conversion, filtering, amplification and transmission to the communication network 510 (or networks) via the transmit antenna 556.

In addition to processing communication signals, the DSP 558 provides for control of the receiver 550 and the transmitter 552. For example, gains applied to communication signals in the receiver 550 and the transmitter 552 may be adaptively controlled through automatic gain control algorithms implemented in the DSP 558.

In a data communication mode, a received signal, such as a text message or web page download, is processed by the communication subsystem 570 and is input to the microprocessor 528. The received signal is then further processed by the microprocessor 528 for an output to the display 526, or alternatively to some other auxiliary I/O devices 506. A device user may also compose data items, such as e-mail messages, using the keyboard 514 and/or some other auxiliary I/O device 506, such as a touchpad, a rocker switch, a thumb-wheel, or some other type of input device. The composed data items may then be transmitted over the communication network 510 via the communication subsystem 570.

In a voice communication mode, overall operation of the device is substantially similar to the data communication mode, except that received signals are output to a speaker 511, and signals for transmission are generated by a microphone 512. Alternative voice or audio I/O subsystems, such as a voice message recording subsystem, may also be implemented on the mobile device 500. In addition, the display 526 may also be utilized in voice communication mode, for example, to display the identity of a calling party, the duration of a voice call, or other voice call related information.

The short-range communications subsystem 502 enables communication between the mobile device 500 and other proximate systems or devices, which need not necessarily be similar devices. For example, the short range communications subsystem may include an infrared device and associated circuits and components, or a Bluetooth™ communication module to provide for communication with similarly-enabled systems and devices.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method for processing, in a synthesis apparatus, signals received from an antenna array in a wireless communications system having a plurality of radio access transceivers and a plurality of mobile devices located within an object plane, the method comprising:

performing a transformation comprising aperture synthesis to map signal content of the signals received from the plurality of mobile devices at the antenna array to at least one element of a plurality of elements in an image plane storage to produce a time series of values for the at least one element, each element of the image plane storage corresponding to a coverage area of the object plane; and assigning the at least one element to at least one radio access transceiver of the plurality of radio access transceivers for receiving the time series of values from the at least one element.

2. The method of claim 1, wherein performing a transformation comprising aperture synthesis comprises:

measuring complex correlation of signals received from pairs of antennas of the antenna array to produce correlation samples; and using an inverse Fourier transform for mapping from the correlation samples to the time series of values for the at least one element.

3. The method of claim 2, wherein performing a transformation comprising aperture synthesis further comprises applying phase corrections determined based on signals from calibration sources.

4. The method of claim 1, wherein the time series of values for the at least one element represents a signal for the at least one radio access transceiver to signal process according to a radio access technology used by at least one of the plurality of mobile devices.

5. The method of claim 1, wherein assigning comprises assigning an individual element to an individual radio access transceiver so as to permit the individual radio access transceiver to service at least one mobile device of the plurality of mobile devices having signal content mapped to the individual element by the transformation.

6. The method of claim 1, further comprising dynamically adjusting the assignment in response to mobility of a mobile device.

7. The method of claim 1, further comprising responding to a change in the element to which signal content from a mobile device is mapped by the transformation, the change due to mobility of the mobile device from a coverage area mapped to an element assigned to a first radio access transceiver to a coverage area mapped to an element assigned to a second radio access transceiver, by allowing the mobile device to initiate handover from the first radio access transceiver to the second radio access transceiver.

8. The method of claim 1, further comprising responding to mobility of a mobile device by adjusting weighting coefficients applied in a focusing operation to alter the transformation from signal content of the signals received from the antenna array to a time series of values for the at least one element.

9. A method for processing, in a synthesis apparatus, signals for transmission by an antenna array in a wireless communications system having a plurality of radio access transceivers and a plurality of mobile devices located within an object plane, the method comprising:

assigning at least one radio access transceiver of the plurality of radio access transceivers to at least one element of a plurality of elements in an image plane storage, each element of the image plane storage corresponding to a coverage area of the object plane, the assignment providing for the at least one element to receive a time series of values from the at least one radio access transceiver; and performing a transformation comprising antenna synthesis to map the time series of values from the at least one element to the signals for transmission by the antenna array.

10. The method of claim 9, wherein performing a transformation comprising antenna synthesis comprises:

using a Fourier transform for mapping from the time series of values for the at least one element to a set of correlation samples; and deriving amplitude and phase of the signals for transmission based on the set of correlation samples.

11. The method of claim 9, wherein the time series of values from the at least one radio access transceiver represents a signal resulting from signal processing according to a radio access technology used by at least one of the plurality of mobile devices.

12. The method of claim 9, wherein assigning comprises assigning an individual radio access transceiver to an individual element so as to permit the individual radio access transceiver to service at least one mobile device of the plurality of mobile devices within a coverage area, the coverage area receiving, due to the transformation, signal content based on the time series of values from the individual element.

13. The method of claim 9, further comprising dynamically adjusting the assignment in response to mobility of a mobile device.

14. The method of claim 9, further comprising responding to mobility of the mobile device from a coverage area receiving, due to the transformation, signal content based on a time series of values from a first element to a coverage area receiving, due to the transformation, signal content based on a time series of values from a second element by allowing the mobile device to initiate handover from a radio access transceiver assigned to the first element to a radio access transceiver assigned to the second element.

15. The method of claim 9, further comprising responding to mobility of a mobile device by adjusting weighting coefficients applied in a focusing operation to alter how the time series of values for the at least one element is transformed to the signals for transmission.

16. An apparatus for processing signals received from an antenna array in a wireless communications system having a plurality of radio access transceivers and a plurality of mobile devices located within an object plane, the apparatus comprising:

a processor;

an image plane storage having a plurality of elements; and an assignment device, wherein processing signals comprises:

the processor performing a transformation comprising aperture synthesis to map signal content of the signals received from the plurality of mobile devices at the antenna array to at least one element of the plurality of elements of the image plane storage to produce a time series of values for the at least one element, each element of the image plane storage corresponding to a coverage area of the oblect plane; and the assignment device assigning the at least one element to at least one radio access transceiver of the plurality of radio access transceivers for receiving the time series of values from the at least one element.

17. The apparatus of claim 16, wherein performing a transformation comprising aperture synthesis comprises the processor:

measuring complex correlation of signals received from pairs of antennas of the antenna array to produce correlation samples; and using an inverse Fourier transform for mapping from the correlation samples to the time series of values for the at least one element.

18. The apparatus of claim 16, further comprising the antenna array.

19. The apparatus of claim 18, wherein a portion of the antenna array is arranged with a quasi-random spacing in at least one of a substantially circular or a substantially ovoid pattern having a view of an area for communications.

20. The apparatus of claim 16, further comprising the plurality of radio access transceivers.

21. An apparatus for processing signals for transmission by an antenna array in a wireless communications system having a plurality of radio access transceivers and a plurality of mobile devices located within an object plane, the apparatus comprising:

a processor;

an image plane storage having a plurality of elements; and an assignment device, wherein processing signals comprises:

the assignment device assigning at least one radio access transceiver of the plurality of radio access transceivers to at least one element of the plurality of elements of the image plane storage, each element of the image plane storage corresponding to a coverage area of the object plane, the assignment providing for the at least one element to receive a time series of values from the at least one radio access transceiver; and the processor performing a transformation comprising antenna synthesis to map the time series of values from the at least one element to the signals for transmission by the antenna array.

22. The apparatus of claim 21, wherein performing a transformation comprising antenna synthesis comprises the processor:

using a Fourier transform for mapping from the time series of values for the at least one element to a set of correlation samples; and deriving amplitude and phase of the signals for transmission based on the set of correlation samples.

23. The apparatus of claim 21, further comprising the antenna array.

24. The apparatus of claim 23, wherein a portion of the antenna array is arranged with a quasi-random spacing in at least one of a substantially circular or a substantially ovoid pattern having a view of an area for communications.

25. The apparatus of claim 21, further comprising the plurality of radio access transceivers.

* * * * *